A. SEGUIN.
APPARATUS FOR MEASURING SPEED.
APPLICATION FILED MAY 25, 1920.
1,424,384. Patented Aug. 1, 1922.
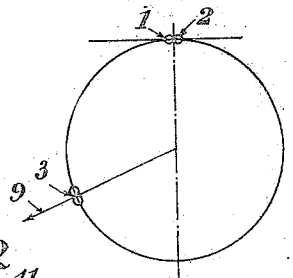
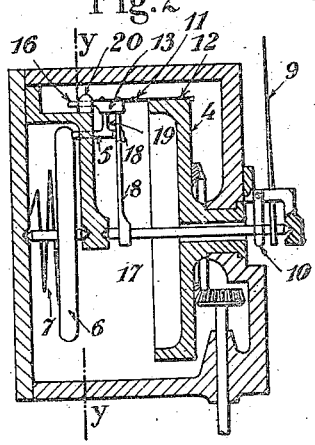
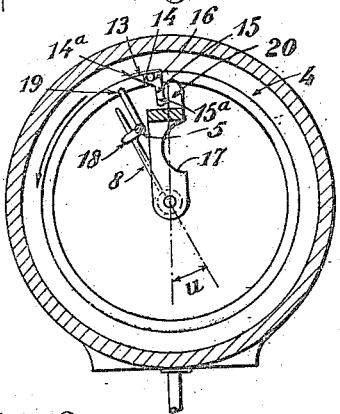
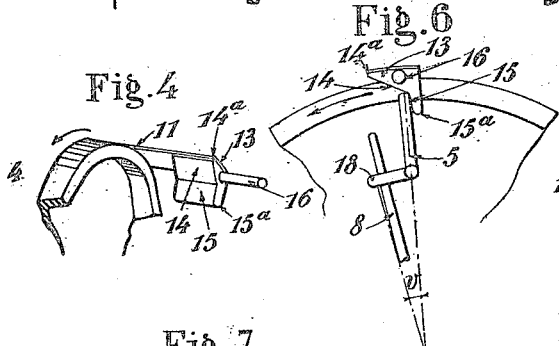
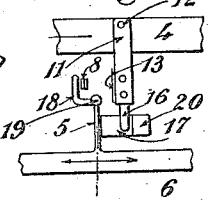
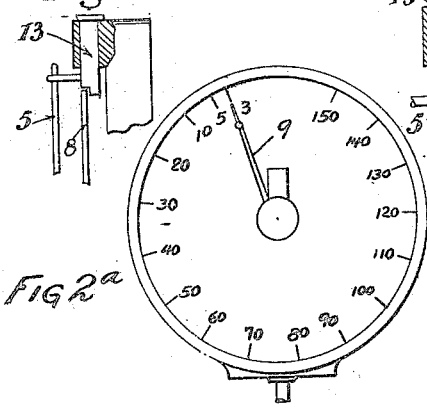
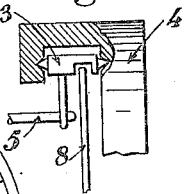
INVENTOR
AUGUSTIN SEGUIN
BY
HIS ATTORNEY

UNITED STATES PATENT OFFICE.

AUGUSTIN SEGUIN, OF PARIS, FRANCE.

APPARATUS FOR MEASURING SPEED.

1,424,384.  Specification of Letters Patent.  Patented Aug. 1, 1922.

Application filed May 25, 1920. Serial No. 384,101.

*To all whom it may concern:*

Be it known that I, AUGUSTIN SEGUIN, citizen of the Republic of France, residing at 26, Rue François-Premier, Paris, in the Republic of France, have invented new and useful Improvements in Apparatus for Measuring Speed, of which the following is a specification.

The present invention has for its object an apparatus intended for the measurement of speeds, essentially characterized by the fact that with this apparatus, any speed which is to be measured is defined by the position of the meeting point of two moving elements to which a rotary movement is imparted over one and the same circle, starting from the same point at the same instant in reverse directions, the one having imparted to it a movement the speed of which is constantly equal or proportional to that which it is desired to measure, and the other having imparted to it a movement the speed of which is subjected to any law, even dependent on the speed of the first movable, provided that the ratio of these two speeds is not constant, the movement of this second moving element being capable also of being independent or not of the first.

In the acompanying drawing and by way of example:—

Fig. 1 is a diagram for the explanation of the principle of the apparatus constructed according to the invention.

Figure 2 shows a mode of construction thereof in vertical diametrical section.

Fig. 2ᵃ is a front view of the apparatus showing the indicating dial.

Figure 3 is a transverse section thereof on the line Y—Y (Figure 1).

Figure 4 is a detail view in perspective of the pawls and their connection with the fly wheel.

Figure 5 is a detail view in plan of a portion of the apparatus which acts on the pallets.

Figure 6 is a partial reproduction of Figure 3 for the explanation of the adjustment of the apparatus.

Figures 7 and 8 show two modifications of oscillating pallets.

As shown in Figure 1, let 1 be the first moving elements and 2 the second. The moving elements 1 starts with a speed which is equal or proportional to that which it is desired to measure. The moving elements 2 starts from the same point, in the opposite direction, at the same instant, with a speed which is subjected to the law chosen which will be a constant of the apparatus. It will be seen that the point 3 where these two moving elements meet will depend upon the speed of the first, and will serve to measure it.

The apparatus about to be hereinafter described, by way of example, embodies the theoretical conditions set forth above.

This apparatus is composed (see Figures 2, 3, 4 and 5) of a fly wheel 4, rotating with a speed which is equal or proportional to that which it is desired to measure, of an arm 5, of $\perp$ form, fixed on a balance wheel 6 provided with a spiral spring 7, of an arm 8, integral with the pointer 9 the movement of which is braked by a spring 10, bearing upon its spindle 10ᵃ.

The fly wheel 4 bears on a point of its periphery a spring tongue 11, fixed at 12 to the periphery and carrying on its end a pawl or escapement 13. This pawl 13 has an inclined part 14, a radial part 15 and a cylindrical tail 16.

This pawl or escapement 13 represents the first moving elements and the arm 5 the second one.

If the pointer be supposed to be at the initial position, as is represented in Figure 2ᵃ, the arm 5 is situated in the position which it occupies at the end of its course determined by the contact of the arm 5 with the part 17 of the frame, under the action of the tension of the spiral spring 7. The arm 8 of the pointer 9 is situated when at rest against the bent end 18 of the arm 5 which thus determines the zero position of the pointer 9. The pawl 13 is on the right of arm 5. If the fly wheel 4 be turned in the direction indicated by the arrow, with a speed equal or proportional to that which it is desired to measure, the pawl 13 will first come into contact with the arm 5, the finger 19 on this arm coming in contact with the edge 14ᵃ of the pawl. Under the influence of the spiral spring 7 and the inclination of the part 14, the arm 5 partially lifts the pawl causing the spring tongue 11 to bend and will bear on the radial part 15. It will then be driven by the pawl 13 and will follow its movement driving the balance wheel which will wind up its spiral spring. In this movement, the end 15ᵃ of the radial part of the pawl 13, being raised, will pass underneath the arm 8, without driving it.

The pawl 13 will continue to drive the arm 5 winding up the spiral spring 7 of the balance wheel 6 more and more, until a finger 20, integral with the frame of the apparatus raises the tail 16 of the pawl then lifting the pawl right up and freeing the arm 5, which moves to the rear under the action of the expansion of the spiral spring of the balance wheel. The pawl 13 continuing to rotate disengages itself from the finger 20 and falls back completely.

When the arm 8 is in its initial position, the angle $u$ is then formed by the arm of the pointer in said initial position and by the finger 20. The position of the arm 8 which would be situated inside said angle $u$, if the arm 17 did not prevent the finger 5 to rotate further to the right, would correspond to very low speeds. This angle $u$ may be as small as may be desired, and will thus determine the lowest speed from which the pointer will begin to move; said speed is about $3^{km}$ per hour. The pawl 13 by continuing its rotation, will arrive in front of the arm 8 of the pointer, before the arm 5, which continues to rotate freely in the opposite direction under the action of the expansion of the spiral spring of the balance wheel. As at this moment the pawl 13 is completely lowered, its radial part 15 will meet the arm 8 of the pointer, driving it along in its movement as well as the pointer 9. Then when it has arrived at a certain point of its course the arm 5 will meet the pawl 13, will engage as formerly under the inclined part 14, partially lifting the pawl and freeing the arm 8 from its driving action. The arm 8 and the pointer 9 then remain in place, while the pawl again drives along the arm 5 in its movement, again winding up the spiral spring until the finger 20 passing under the tail of the pawl again lets the arm 5 pass to the rear under the action of the expansion of the spiral spring of the balance wheel.

It will therefore be seen, that if the speed to be measured remains constant, the arm 5 and the pawl 13 will again meet exactly at the same point, partially lifting the pawl by this meeting, as has been explained above, so that the pawl 13 will drive again the arm 5 in its movement winding up the spiral spring of the balance wheel, without the arm 8 of the pointer having been touched, neither by the pawl 13 nor by the arm 5.

This same cycle recommences indefinitely and if the speed to be measured does not change, the arm 8 of the pointer will never be touched either by the pawl or by the arm 5 and the pointer will remain stationary, its position thus serving to measure the speed.

If the speed to be measured increases, the pawl 13 will meet the arm 8 of the pointer before meeting the arm 5 and the pawl 13 will then be closed, the arm 8 will be driven along up to the new point of contact with the arm 5 and of the pawl or the arm 8 will be freed and will determine the new position of the pointer 9 measuring the new speed.

If the speed to be measured decreases, the arm 5 in its return movement under the action of the expansion of the spiral spring of the balance wheel, will encounter the arm 8 of the pointer, before meeting the pawl 13, and will therefore drive the arm 8 up to the point of this meeting where the arm 8 will be freed, since the arm 5 which drove it passes to the rear, pushed by the pawl, and as the pawl, partially lifted by this arm, passes over the arm 8 without touching it, thus determining a new position of the pointer 9 measuring the new speed.

It will be noted in this apparatus, when the speed to be measured remains constant, the measuring pointer 9 driven by the arm 8, is never in contact with any moving part of the apparatus, thus effecting an absolutely perfect stability of this pointer. Furthermore, the apparatus can be so adjusted as to leave (see Figure 6) a dead angle $v$ at the moment when the pawl is partially raised by the arm 5, between the edge of the radial part of the pawl 13 and the finger 18 which drives the arm 5. It will be seen that in this way the arm 8 having attained a position of stability for a determined (fixed) speed to be measured, it will not quit this position except for a variation of this speed, the magnitude of which will be a function of the dead angle $v$. The indicating pointer will thus be able to have a periodicity which is desired.

It must be quite understood that the form of spring pallet is given here solely by way of example, and that this pawl may also be equally well an oscillating device like these shown in Figures 7 and 8, or of any other form which permits this device to carry out its function.

In like manner, a pawl has been described serving both to drive the indicating pointer and to wind up the balance wheel, but an independent part for winding up the balance wheel and freeing it at the point 20 may equally well be provided for this latter function.

Having now described my invention, what I claim as new and desire to secure by Letters Patent is:—

1. An apparatus for the measurement of speeds, comprising a driving movable member (4), means for rotating said driving movable member in a positive direction at a speed in a known ratio to that which it is desired to measure, an antagonistic movable member constituted by a balance wheel, a spiral spring driving directly said antagonistic member in a negative direction at the variable speed determined by the law of free expansion of said spring, a receptive member, indicating means connected to said receptive member, means on the driving member adapted to couple said driving member with the receptive member for rotation in the positive direction, means adapted to connect said driving member with the antagonistic member for driving the latter in a positive direction, means on the antagonistic member for driving the receptive member in a negative direction, means on the antagonistic member for disengaging the receptive member from the driving member, and fixed means for disengaging the antagonistic member from the driving member.

2. An apparatus for the measurement of speeds, comprising a rotatable member, means for rotating said member in a positive direction at a speed in a known ratio to that which it is desired to measure, an antagonistic member constituted by a balance wheel, a spiral spring driving directly said balance wheel and tending to rotate the latter in a negative direction at the variable speed determined by the law of free expansion of said spring, a coupling member on said rotatable member, a part on the balance wheel adapted to engage with said coupling member for rotation in the positive direction, a receptive member adapted to be engaged by the coupling member for rotation in the positive direction and by the balance wheel for rotation in the negative direction, indicating means connected to said receptive member, the coupling member being so constructed that it is disengaged from the receptive member when in engagement with the said part, and a fixed cam for disengaging the coupling member from the said part.

3. An apparatus for the measurement of speeds comprising a rotatable member, means for rotating said member in a positive direction at a speed in a known ratio to that which it is desired to measure, a balance wheel, a spiral spring driving directly said balance wheel and tending to rotate the latter in a negative direction, a coupling member on said rotatable member, said coupling member comprising a spring tongue secured to the rotatable member and a head having a radial surface and an inclined surface, a finger on the balance wheel adapted to engage with both radial and inclined surfaces on said head, whereby the balance wheel may be rotated by the said radial surface in the positive direction; a rotatable arm adapted to be engaged by the radial surface on said head, for rotation in the positive direction, so long as the said finger is not in engagement with the said head, a member on the balance wheel adapted to rotate the rotatable arm in the negative direction and a fixed cam adapted to disengage the said finger from the said radial surface.

In testimony whereof I have signed my name to this specification.

AUGUSTIN SEGUIN.